US010411751B2

(12) United States Patent
Gollakota et al.

(10) Patent No.: US 10,411,751 B2
(45) Date of Patent: Sep. 10, 2019

(54) AMBIENT BACKSCATTER TRANSCEIVERS, APPARATUSES, SYSTEMS, AND METHODS FOR COMMUNICATING USING BACKSCATTER OF AMBIENT RF SIGNALS

(71) Applicant: University of Washington, Seattle, WA (US)

(72) Inventors: Shyamnath Gollakota, Seattle, WA (US); Joshua R. Smith, Seattle, WA (US); Vincent Liu, Seattle, WA (US); Aaron N. Parks, Seattle, WA (US); Vamsi Talla, Seattle, WA (US)

(73) Assignee: University of Washington, Seattle, WA (US)

( * ) Notice: Subject to any disclaimer, the term of this patent is extended or adjusted under 35 U.S.C. 154(b) by 0 days.

(21) Appl. No.: 16/043,383

(22) Filed: Jul. 24, 2018

(65) Prior Publication Data

US 2018/0358996 A1    Dec. 13, 2018

Related U.S. Application Data

(63) Continuation of application No. 15/601,836, filed on May 22, 2017, now Pat. No. 10,033,424, which is a (Continued)

(51) Int. Cl.
*H04B 1/38* (2015.01)
*H04B 1/40* (2015.01)

(52) U.S. Cl.
CPC ..................................... *H04B 1/40* (2013.01)

(58) Field of Classification Search
CPC ......... H04B 1/40; H04B 10/071; G01S 15/02; G06K 19/0701; G06K 19/0715;
(Continued)

(56) References Cited

U.S. PATENT DOCUMENTS 4,298,280 A    11/1981 Harney
4,916,460 A    4/1990 Powell
(Continued)

FOREIGN PATENT DOCUMENTS

EP        2976734        1/2016
WO    2014153516 A1    9/2014
(Continued)

OTHER PUBLICATIONS

US 10,187,177 B2, 01/2019, Gollakota et al. (withdrawn)
(Continued)

*Primary Examiner* — Tesfaldet Bocure
(74) *Attorney, Agent, or Firm* — Dorsey & Whitney LLP

(57) ABSTRACT

Apparatuses, systems, ambient backscatter transceivers, and methods for modulating a backscatter of an ambient RF signal are described. An example system may include an ambient backscatter transceiver comprising an antenna that is configured to receive a backscattered ambient radio frequency (RF) signal. The ambient backscatter transceiver is configured to demodulate the backscattered ambient RF signal to retrieve first data. The backscattered ambient RF signal is generated by backscattering an ambient RF signal at a first frequency. The ambient RF signal is encoded with modulated to provide second data at a second frequency.

20 Claims, 4 Drawing Sheets

Related U.S. Application Data continuation of application No. 14/795,719, filed on Jul. 9, 2015, now Pat. No. 9,680,520, which is a continuation-in-part of application No. PCT/US2014/031462, filed on Mar. 21, 2014.

(60) Provisional application No. 61/804,520, filed on Mar. 22, 2013, provisional application No. 62/023,125, filed on Jul. 10, 2014.

(58) Field of Classification Search
CPC .......... G06K 7/10039; G06K 19/0707; G06K 19/0712; G06K 19/0716; G06K 19/0723; G06K 19/0726; G06K 19/07758; G06K 7/0008; G06K 7/10059; G01V 5/0075
USPC .................. 375/219; 340/10.1; 455/41.2
See application file for complete search history.

(56) References Cited

U.S. PATENT DOCUMENTS

| | | |
|---|---|---|
| 5,220,330 A | 6/1993 | Salvail et al. |
| 5,321,599 A | 6/1994 | Tanamachi et al. |
| 5,649,296 A | 7/1997 | Maclellan et al. |
| 5,663,710 A | 9/1997 | Fasig et al. |
| 5,995,040 A | 11/1999 | Issler et al. |
| 6,084,530 A | 7/2000 | Pidwerbetsky et al. |
| 6,094,450 A | 7/2000 | Shockey |
| 6,243,012 B1 | 6/2001 | Shober et al. |
| 6,297,696 B1 | 10/2001 | Abdollahian et al. |
| 6,611,224 B1 | 8/2003 | Nysen et al. |
| 6,745,008 B1 | 6/2004 | Carrender et al. |
| 6,765,476 B2 | 7/2004 | Steele et al. |
| 6,838,989 B1 | 1/2005 | Mays et al. |
| 6,870,460 B2 | 3/2005 | Turner et al. |
| 6,970,089 B2 | 11/2005 | Carrender |
| 7,180,402 B2 | 2/2007 | Carrender et al. |
| 7,215,976 B2 | 5/2007 | Brideglall |
| 7,358,848 B2 | 4/2008 | Mohamadi |
| 7,469,013 B1 | 12/2008 | Bolt et al. |
| 7,535,360 B2 | 5/2009 | Barink et al. |
| 7,796,016 B2 | 9/2010 | Fukuda |
| 7,839,283 B2 | 11/2010 | Mohamadi et al. |
| 7,961,093 B2 | 6/2011 | Chiao et al. |
| 7,995,685 B2 | 8/2011 | Wang et al. |
| 8,026,839 B2 | 9/2011 | Weber |
| 8,120,465 B2* | 2/2012 | Drucker ............... G06K 7/0008 340/10.1 |
| 8,170,485 B2 | 5/2012 | Hulvey |
| 8,284,032 B2 | 10/2012 | Lee et al. |
| 8,391,824 B2 | 3/2013 | Kawaguchi |
| 8,526,349 B2 | 9/2013 | Fischer |
| 8,797,146 B2 | 8/2014 | Cook et al. |
| 8,952,789 B2* | 2/2015 | Dardari ................. G01S 13/02 340/10.3 |
| 8,971,704 B2 | 3/2015 | Cavaliere et al. |
| 9,312,950 B1 | 4/2016 | Deyle |
| 9,357,341 B2 | 5/2016 | Deyle |
| 9,680,520 B2 | 6/2017 | Gollakota et al. |
| 9,973,367 B2 | 5/2018 | Gollakota et al. |
| 10,033,424 B2 | 7/2018 | Gollakota et al. |
| 10,079,616 B2 | 9/2018 | Reynolds et al. |
| 2002/0015436 A1 | 2/2002 | Ovard et al. |
| 2003/0043949 A1 | 3/2003 | O'Toole et al. |
| 2003/0133495 A1 | 7/2003 | Lerner et al. |
| 2003/0174672 A1 | 9/2003 | Herrmann |
| 2004/0005863 A1 | 1/2004 | Carrender |
| 2004/0210611 A1 | 10/2004 | Gradishar et al. |
| 2005/0053024 A1 | 3/2005 | Friedrich |
| 2005/0099269 A1 | 5/2005 | Diorio et al. |
| 2005/0201450 A1 | 9/2005 | Volpi et al. |
| 2005/0248438 A1 | 11/2005 | Hughes et al. |
| 2005/0265300 A1 | 12/2005 | van Rensburg |
| 2006/0044147 A1 | 3/2006 | Knox et al. |
| 2006/0045219 A1 | 3/2006 | Wang et al. |
| 2006/0082458 A1 | 4/2006 | Shanks et al. |
| 2006/0087406 A1 | 4/2006 | Willins et al. |
| 2006/0109127 A1 | 5/2006 | Barink et al. |
| 2006/0220794 A1 | 10/2006 | Zhu |
| 2006/0236203 A1 | 10/2006 | Diorio et al. |
| 2006/0261952 A1 | 11/2006 | Kavounas et al. |
| 2007/0018904 A1 | 1/2007 | Smith |
| 2007/0046434 A1 | 3/2007 | Chakraborty |
| 2007/0069864 A1 | 3/2007 | Bae et al. |
| 2007/0096876 A1 | 5/2007 | Bridgelall et al. |
| 2007/0109121 A1 | 5/2007 | Cohen |
| 2007/0111676 A1 | 5/2007 | Trachewsky et al. |
| 2007/0115950 A1 | 5/2007 | Karaoguz et al. |
| 2007/0201786 A1 | 8/2007 | Wuilpart |
| 2007/0210923 A1 | 9/2007 | Butler et al. |
| 2007/0285245 A1 | 12/2007 | Djuric et al. |
| 2007/0293163 A1 | 12/2007 | Kilpatrick |
| 2008/0131133 A1 | 6/2008 | Blunt et al. |
| 2008/0136646 A1 | 6/2008 | Friedrich |
| 2008/0165007 A1 | 7/2008 | Drago et al. |
| 2008/0180253 A1* | 7/2008 | Ovard .................. G06K 7/0008 340/572.4 |
| 2008/0207357 A1 | 8/2008 | Savarese et al. |
| 2008/0211636 A1 | 9/2008 | O'Toole et al. |
| 2008/0225932 A1 | 9/2008 | Fukuda |
| 2008/0252442 A1 | 10/2008 | Mohamadi et al. |
| 2009/0201134 A1 | 8/2009 | Rofougaran |
| 2009/0243804 A1 | 10/2009 | Fukuda |
| 2010/0156651 A1 | 6/2010 | Broer |
| 2010/0271188 A1 | 10/2010 | Nysen |
| 2011/0053178 A1 | 3/2011 | Yang |
| 2012/0001732 A1 | 1/2012 | Kawaguchi |
| 2012/0002766 A1 | 1/2012 | Kawaguchi |
| 2012/0051411 A1 | 3/2012 | Duron et al. |
| 2012/0112885 A1 | 5/2012 | Drucker |
| 2012/0245444 A1 | 9/2012 | Otis et al. |
| 2012/0311072 A1 | 12/2012 | Huang et al. |
| 2012/0313698 A1 | 12/2012 | Ochoa et al. |
| 2013/0028305 A1 | 1/2013 | Gollakota et al. |
| 2013/0028598 A1 | 1/2013 | Cavaliere et al. |
| 2013/0069767 A1 | 3/2013 | Ovard et al. |
| 2013/0176115 A1 | 7/2013 | Puleston et al. |
| 2013/0215979 A1* | 8/2013 | Yakovlev ............. H04B 5/0031 375/256 |
| 2013/0223270 A1 | 8/2013 | Cheng |
| 2013/0265140 A1 | 10/2013 | Gudan et al. |
| 2013/0286959 A1 | 10/2013 | Lou et al. |
| 2013/0322498 A1 | 12/2013 | Maquire |
| 2014/0044233 A1 | 2/2014 | Morton |
| 2014/0113561 A1 | 4/2014 | Maguire |
| 2014/0313071 A1 | 10/2014 | Mccorkle |
| 2014/0364733 A1 | 12/2014 | Huang et al. |
| 2015/0108210 A1* | 4/2015 | Zhou ..................... H03H 7/18 235/375 |
| 2015/0311944 A1 | 10/2015 | Gollakota et al. |
| 2015/0381269 A1 | 12/2015 | Deyle |
| 2016/0094933 A1* | 3/2016 | Deyle .................. H04L 27/3455 375/262 |
| 2016/0266245 A1 | 9/2016 | Bharadia et al. |
| 2016/0365890 A1 | 12/2016 | Reynolds et al. |
| 2017/0180075 A1 | 6/2017 | Gollakota et al. |
| 2017/0180178 A1 | 6/2017 | Gollakota et al. |
| 2017/0180703 A1 | 6/2017 | Kovacovsky et al. |
| 2017/0331509 A1 | 11/2017 | Gollakota et al. |
| 2018/0331865 A1 | 11/2018 | Ziv et al. |
| 2018/0375703 A1 | 12/2018 | Kellogg et al. |

FOREIGN PATENT DOCUMENTS

| | | |
|---|---|---|
| WO | 2015123306 A1 | 8/2015 |
| WO | 2015123341 A1 | 8/2015 |
| WO | 2016100887 A2 | 6/2016 |
| WO | 2017027847 A1 | 2/2017 |
| WO | 2017132400 A1 | 8/2017 |
| WO | 2017176772 A1 | 10/2017 |

(56) References Cited

FOREIGN PATENT DOCUMENTS

| | | |
|---|---|---|
| WO | 2018075653 A1 | 4/2018 |
| WO | 2018187737 A1 | 10/2018 |

OTHER PUBLICATIONS

US 10,187,241 B2, 01/2019, Gollakota et al. (withdrawn)
Cadence, "Cadence Spectre RF Option", http://www.cadence.com/products/rf/spectre_rf_simulation/pages/default.aspx. (Retrieved Jul. 19, 2018).
Digipoints. DigiPoints Series vol. 1 Leader Guide Module 9—Network Architectures. Sep. 18, 2015, pp. 9.i-9.18.
IEEE, "IEEE Standard for Ethernet", http://standards.ieee.org/getieee802/download/802.11-2012.pdf., Dec. 28, 2012.
Maxim Integrated, "2.4GHz to 2.5GHz 802.11 g/b FR Transceiver, PA, and Rx/Tx/Antenna Diversity Switch", https://datasheets.maximintegrated.com/en/ds/MAX2830.pdf. (Retrieved Jul. 19, 2018).
NASA, "A Wi-Fi Reflector Chip to Speed Up Wearables", http://www.jpl.nasa.gov/news/news.php?feature=4663. Jul. 22, 2015.
PCT Application No. PCT/US2018/026545 titled 'Image and/or Video Transmission Using Backscatter Devices' filed on Apr. 6, 2018.
Qualcomm, "AR9462 Single-chip, 2.4/5GHz, 2-stream 802.11a/b/g/n and BT 4.0 + HS SoC Solution with SST Technology", http://www.qca.qualcomm.com/wp-content/uploads/2013/11/AR9462.pdf. (Retrieved Jul. 19, 2018).
Qualcomm. "QCA4002/4004 Qualcomm low-power Wi-Fi", http://www.eeworld.com.cn/zt/wireless/downloads/QCA4002-4004FIN.pdf. (Retrieved Jul. 19, 2018).
Synopsys, "Concurrent Timing, Area, Power and Test Optimization", http://www.synopsys.com/Tools/Implementation/RTLSynthesis/DesignCompiler/Pages/default.aspx. (Retrieved Jul. 19, 2018).
U.S. Appl. No. 15/752,214 entitled 'Backscatter Devices and Network Systems Incorporating Backscatter Devices' filed Feb. 12, 2018, pp. all.
U.S. Appl. No. 16/072,858, titled "Backscatter Devices Including Examples of Single Sideband Operations", filed Jul. 25, 2018.
Unknown, "Altera de1 fpga development board", http://www.terasic.com.tw/cgi-bin/page/archive.pl?No=83.(Retrieved Jul. 19, 2018).
Unknown, "Analog Devices HMC190BMS8/190BMS8E", https://www.hittite.com/content/documents/data_sheet/hmc190bms8.pdf. (Retrieved Jul. 19, 2018).
Unknown, "Nest Cam Indoor", https://nest.com/camera/meet-nest-cam/?dropcam=true. 2018. (Retrieved Jul. 19, 2018).
U.S. Appl. No. 15/958,880 titled 'Apparatuses, Systems, and Methods for Communicating Using MIMO and Spread Spectrum Coding in Backscatter of Ambient Signals' filed Apr. 20, 2018.
"Advanced Television Systems Committee (ATSC) (Sep. 1995) "ATSC Digital Television Standard", ATSC Doc. A/53, 74 pages", Sep. 1995.
"Analog Devices (retrieved Apr. 2016) "ADG919 RF Switch Datasheet," available online at: http://www.datasheet-pdf.com/PDF/ADG919-Datasheet-AnalogDevices-140819", Apr. 2016.
"Analog Devices, Inc. (retrieved Jan. 2016) "ADG902 RF switch datasheet," available online at: http://www.analog.com/static/imported-files/data_sheets/adg901_902.pdf", Jan. 2016.
"Axcera.com (retrieved Jan. 2016) "8VSB vs. COFDM," available online at: http://www.axcera.com/downloads/technotes-whitepapers/technote_4.pdf", Jan. 2016.
"DiBEG (May 2014; retrieved Jan. 2016) "The Launching Country," available online at: http://www.dibeg.org/world/world.html", May 2014.
"E. Inc. (retrieved Apr. 2016) "Universal software radio peripheral," available online at: http://ettus.com", Apr. 2016.
"Encounternet (retrieved Jan. 2016) "The Encounternet Project," available online at: http://encounternet.net/", Jan. 2016.
"Federal Communications Commission (retrieved Jan. 2016) "41 dBu service contours around ASRN 1226015, FCC TV query database," available online at: http://transition.fcc.gov/fcc-bin/tvq?list=0&facid=69571", Jan. 2016.

"STMicroelectronics (Jul. 2012) "TS 881 Datasheet," 1 page", Jul. 2012.
Anthony,, Sebastian , ""Free energy harvesting from TV signals, to power a ubiquitous Internet of things"", ExtremeTech, google search, Jul. 8, 2013, 8 pages, Jul. 8, 2013.
Bharadia, et al., "Backfi: High Throughput WiFi Backscatter". In Proceedings of the 2015 ACM Conference on Special Interest Group on Data Communication, Aug. 2015.
Bharadia, et al., ""Full duplex backscatter"", Proceedings of the 12th ACM Workshop on Hot Topics in Networks, Article No. 4, pp. 1-7, Nov. 2013.
Bharadia, et al., ""Full duplex radios"", Proceedings of the ACM SIGCOMM 2013 (SIGCOMM '13), pp. 375-386, Aug. 2013.
Bohorquez, et al., ""A 350μW CMOS MSK transmitter and 400μW OOK super-regenerative receiver for medical implant communications"", IEEE Journal of Solid-State Circuits, 44(4):1248-1259, Apr. 2009.
Buettner, ""Backscatter Protocols and Energy-Efficient Computing for RF-Powered Devices"", PhD Thesis, University of Washington, Seattle, WA, 144 pages, Retrieved Jan. 2016., 2012.
Buettner, et al., ""Dewdrop: An energy-aware runtime for computational RFID"", Proceedings of the 8th USENIX Conference on Networked Systems Design and Implementation (NSDI'11), pp. 197-210, Mar. 2011.
Buettner, et al., ""RFID Sensor Networks with the Intel WISP"", Proceedings of the 6th ACM Conference on Embedded Network Sensor Systems (SenSys '08), pp. 393-394, Nov. 2008.
Chen, et al., Denis Guangyin Chen et al, "Pulse-Modulation Imaging—Review and Performance Analysis", IEEE Transactions on Biomedical Circuits and Systems, vol. 5, No. 1, Feb. 2011, at 64.
Chokshi, et al., "Yes! Wi-Fi and Bluetooth Can Coexist in Handheld Devices", Emerging and Embedded Business Unit, Marvell Semiconductor, Inc., Mar. 2010.
Dayhoff, , ""New Policies for Part 15 Devices"", Federal Communications Commission (FCC) Telecommunications Certification Body Council (TCBC) Workshop 2005, 13 pages, May 2005.
Dementyev, et al., ""Wirelessly Powered Bistable Display Tags"", ACM International Joint Conference on Pervasive and Ubiquitous Computing (UbiComp '13), pp. 383-386, Sep. 2013.
Dementyev, A. et al., ""A Wearable UHF RFID-Based EEG System"", 2013 IEEE International Conference on RFID (RFID), pp. 1-7, Apr.-May 2013.
Duarte, et al., ""Full-duplex wireless communications using off-the-shelf radios: Feasibility and first results"", 2010 Conference Record of the 44th Asilomar Conference on Signals, Systems and Computers (ASILOMAR), pp. 1558-1562, Nov. 2010.
Duarte, , ""Full-duplex Wireless: Design, Implementation and Characterization"", Ph.D. thesis, Rice University, 70 pages, Apr. 2012.
Duc, et al., "Enhancing Security of EPCGlobal Gen-2 RFID against Traceability and Cloning", Auto-ID Labs Information and Communication University, Auto-ID Labs White Paper No. WP-SWNET-016, 11 pages, Retrieved Jan. 2016, 2006 copyright.
Elliott, , ""Average U.S. Home Now Receives a Record 118.6 TV Channels, According to Nielsen"", available online at: http://www.nielsen.com/us/en/insights/pressroom/2008/average_u_s_home.html, Jun. 2008.
Ensworth, et al., "Every smart phone is a backscatter reader: Modulated backscatter compatibility with bluetooth 4.0 low energy (ble) devices". 2015 IEEE International Conference on RFID. (Retrieved Jul. 19, 2018).
Gorlatova, et al., ""Energy harvesting active networked tags (EnHANTs) for ubiquitous object networking"", IEEE Wireless Communications, 17(6):18-25, Dec. 2010.
Greene, et al., "Intel's Tiny Wi-Fi Chip Could Have A Big Impact". MIT Technology review, Sep. 21, 2012.
Guo, et al., ""Virtual full-duplex wireless communication via rapid on-off-division duplex"", 48th Annual Allerton Conference on Communication, Control, and Computing (Allerton), pp. 412-419, Sep.-Oct. 2010.
Jain, et al., ""Practical, real-time, full duplex wireless"", Proceedings of the 17th Annual International Conference on Mobile Computing and Networking (MobiCom'11), pp. 301-312, Sep. 2011.

(56) References Cited

OTHER PUBLICATIONS

Javed, et al., Sajid Javed et al, Background Subtraction Via Superpixel-Based Online Matrix Decomposition With Structured Foreground Constraints. ICCVW '15 Proceedings of the 2015 IEEE International Conference on Computer Vision Workshop, Dec. 2015.
Johnston, Scott , "Software Defined Radio Hardware Survey", Oct. 2011, 31 pgs.
Kellogg, et al., ""'Bringing gesture recognition to all devices"", Proceedings of the 11th USENIX Conference on Network Systems Design and Implementation (NSDI'14), pp. 303-316, Apr. 2014.
Kellogg, et al., "Wi-Fi Backscatter: Internet Connectivity for RF-Powered Devices", University of Washington, SIGCOMM'14, Aug. 17-22, 2014.
Khannur, et al., "A Universal UHF RFID reader IC in 0.18-μm CMOS Technology". Solid-State Circuits, IEEE Journal of, 43(5):1146-1155, May 2008.
Kim, et al., ""'Flush: a reliable bulk transport protocol for multihop wireless networks"", Proceedings of the 5th International Conference on Embedded Networked Sensor Systems (SenSys '07), pp. 351-365, Nov. 2007.
Kleinrock, et al., ""'Packet Switching in Radio Channels: Part I—Carrier Sense Multiple-Access Modes and Their Throughput-Delay Characteristics"", IEEE Transactions on Communications, 23(12):1400-1416, Dec. 1975.
Kodialam, et al., ""'Fast and reliable estimation schemes in RFID systems"", Proceedings of the 12th Annual International Conference on Mobile Computing and Networking (MobiCom '06), pp. 322-333, Sep. 2006.
Koomey, JG et al., ""'Implications of Historical Trends in the Electrical Efficiency of Computing"", IEEE Annals of the History of Computing, 33(3):46-54, Aug. 2011.
Kuester, et al., ""'Baseband Signals and Power in Load-Modulated Digital Backscatter," IEEE Antenna and Wireless Propagation Letter, vol. II, 2012, pp. 1374-1377, Nov. 2012."
Lazarus, , ""'Remote, wireless, ambulatory monitoring of implantable pacemakers, cardioverter defibrillators, and cardiac resynchronization therapy systems: analysis of a worldwide database"", Pacing and Clinical Electrophysiology, 30(Suppl 1):S2-S12, Jan. 2007.
Liang, et al., ""'Surviving wi-fi interference in low power zigbee networks"", Proceedings of the 8th ACM Conference on Embedded Networked Sensor Systems (SenSys '10), pp. 309-322, Nov. 2010.
Liu, et al., ""'Ambient Backscatter: Wireless Communication out of Thin Air"", Proceedings of the Association for Computing Machinery (ACM) 2013 Conference on Special Interest Group on Data Communications (SIGCOMM), pp. 39-50, also in ACM SIGCOMM Communication Review, 43(4):39-50, Aug./Oct. 2013.
Liu, et al., ""'Digital Correlation Demodulator Design for RFID Reader Receiver"", IEEE Wireless Communications and Networking Conference (WCNC 2007), pp. 1666-1670, Mar. 2007.
Liu, et al., ""'Enabling Instantaneous Feedback with Full-duplex Backscatter"", Proceedings of the 20th Annual International Conference on Mobile Computing and Networking (MobiCom'14), pp. 67-78, Sep. 2014.
Lu, et al., "Enfold: Downclocking OFDM in WiFi". In Proceedings of the 20th annual international conference on Mobile computing and networking, pp. 129-140. ACM, Sep. 2014.
Lu, et al., "Slomo: Downclocking WiFi Communication". In NSDI, pp. 255-258, Apr. 2013.
Mace, , ""'Wave reflection and transmission in beams"", Journal of Sound and Vibration, 97(2):237-246, Nov. 1984.
Manweiler, et al., "Avoiding the Rush Hours: Wifi Energy Management via Traffic Isolation". In MobiSys, Jul. 2011.
Mastrototaro, , ""'The MiniMed Continuous Glucose Monitoring System"", Diabetes Technology & Therapeutics, 2(Suppl 1):13-18, Dec. 2000.
Merritt, "Atheros targets cellphone with Wi-Fi chip", EE Times (Nov. 2, 2009), http://www.eetimes.com/document.asp?doc_id=1172134.

Metcalfe, et al., ""'Ethernet: Distributed packet switching for local computer networks"", Communications of the ACM, 19(7):395-404, Jul. 1976.
Mishra, et al., ""'Supporting continuous mobility through multi-rate wireless packetization"", Proceedings of the 9th Workshop on Mobile Computing Systems and Applications (HotMobile '08), pp. 33-37, Feb. 2008.
Mittal, et al., "Empowering developers to estimate app energy consumption". In MobiCom, Aug. 2012.
Murray Associates, "The Great Seal Bug Part 1", Murray Associates, Mar. 2017.
Mutti, et al., ""'CDMA-based RFID Systems in Dense Scenarios: Concepts and Challenges"", 2008 IEEE International Conference on RFID, pp. 215-222, Apr. 2008.
Naderiparizi, et al., Saman Naderiparizi etal, "Ultra-Low-Power Wireless Streaming Cameras", arXiv:1707.08718v1, Jul. 27, 2017, Cornell University Library.
Navaneethan, et al., Security Enhancement of Frequency Hopping Spread Spectrum Based on Oqpsk Technique. IOSR Journal of Electronics and Communication Engineering. May 2016. 62.
Nikitin, et al., ""'Passive tag-to-tag communication"", 2012 IEEE International Conference on RFID (RFID), pp. 177-184, Apr. 2012.
Nikitin, et al., ""'Theory and measurement of backscattering from RFID tags"", IEEE Antennas and Propagation Magazine, 48(6):212-218, Dec. 2006.
Obeid, et al., ""'Evaluation of spike-detection algorithms for a brain-machine interface application"", IEEE Transactions on Biomedical Engineering, 51(6):905-911, Jun. 2004.
Occhiuzzi, et al., ""'Modeling, Design and Experimentation of Wearable RFID Sensor Tag"", IEEE Transactions on Antennas and Propagation, 58(8):2490-2498, Aug. 2010.
Pandey, et al., ""'A Sub-100 μ W MICS/ISM Band Transmitter Based on Injection-Locking and Frequency Multiplication"", IEEE Journal of Solid-State Circuits, 46(5):1049-1058, May 2011.
Parks, et al., ""'A wireless sensing platform utilizing ambient RF energy"", 2013 IEEE Topical Conference on Biomedical Wireless Technologies, Networks, and Sensing Systems (BioWireleSS), pp. 154-156, Jan. 2013.
Parks, Aaron N. et al., "Turbocharging Ambient Backscatter Communication", SIGCOMM, Aug. 2014, 1-12.
Pillai, et al., ""'An Ultra-Low-Power Long Range Battery/Passive RFID Tag for UHF and Microwave Bands With a Current Consumption of 700 nA at 1.5 V"", IEEE Transactions on Circuits and Systems I: Regular Papers, 54(7):1500-1512, Jul. 2007.
Proakis, et al., "Digital communications". 2005. McGraw-Hill, New York. (Retrieved Jul. 19, 2018).
Qing, et al., ""'A folded dipole antenna for RFID"", IEEE Antennas and Propagation Society International Symposium, 1:97-100, Jun. 2004.
Rabaey, et al., ""'PicoRadios for wireless sensor networks: the next challenge in ultra-low power design"", 2002 IEEE International Solid-State Circuits Conference, Digest of Technical Papers (ISSCC), 1:200-201, Feb. 2002.
Ransford, et al., ""'Mementos: system support for long-running computation on RFID-scale devices"", ACM SIGPLAN Notices—Proceedings of the 16th International Conference on Architecturla Support for Programming Languages and Operating Systems (ASPLOS '11), 46(3):159-170, Mar. 2011.
Rao, KVS et al., ""'Antenna design for UHF RFID tags: a review and a practical application"", IEEE Transactions on Antennas and Propagation, 53(12):3870-3876, Dec. 2005.
Rattner, et al., "Connecting the Future: It's a Wireless World", Sep. 2013.
Roy, et al., ""'RFID: From Supply Chains to Sensor Nets"", Proceedings of the IEEE, 98(9):1583-1592, Jul. 2010.
Sample, et al., ""'Design of an RFID-Based Battery-Free Programmable Sensing Platform"", IEEE Transactions on Instrumentation and Measurement, 57(11):2608-2615, Nov. 2008.
Sample, et al., ""'Experimental results with two wireless power transfer systems"", IEEE Radio and Wireless Symposium (RAWCON), pp. 16-18, Jan. 2009.

(56) References Cited

OTHER PUBLICATIONS

Seigneuret, et al., ""Auto-tuning in passive UHF RFID tags"", 2010 8th IEEE International NEWCAS Conference (NEWCAS), pp. 181-184, Jun. 2010.

Sen, et al., ""CSMA/CN: Carrier sense multiple access with collision notification"", Proceedings of the 16th Annual International Conference on Mobile Computing and Networking (MobiCom'10), pp. 25-36, Sep. 2010.

Smith, JR et al., ""A wirelessly-powered platform for sensing and computation"", ACM International Joint Conference on Pervasive and Ubiquitous Computing (UbiComp 2006), 4206:495-506, Sep. 2006.

So, et al., ""Multi-channel mac for ad hoc networks; handling multichannel hidden terminals using a single transceiver"", Proceedings of the 5th ACM International Symposium on Mobile Ad Hoc Networking and Computing, pp. 222-233, May 2004.

Srinivasan, et al., ""An empirical study of low-power wireless"", ACM Transactions on Sensor Networks (TOSN), vol. 6, Issue 2, Article No. 16, Feb. 2010.

Thomas, et al., ""A 96 Mbit/sec, 15.5 pJ/bit 16-QAM modulator for UHF backscatter communication"", 2012 IEEE International Conference on RFID (RFID), IEEE RFID Virtual Journal, pp. 185-190, Apr. 2012.

Tubaishat, et al., ""Sensor networks: an overview"", IEEE Potentials, 22(2):20-23, Apr.-May 2003.

Walden, "Analog-to-digital converter survey and analysis", IEEE Journal on Selected Areas in Communications, 17(4):539-550, Apr. 1999.

Welbourne, et al., ""Building the Internet of Things Using RFID: The RFID Ecosystem Experience"", IEEE Internet Computing, 13(3):48-55, May-Jun. 2009.

Wuu, et al., ""Zero-Collision RFID Tags Identification Based on CDMA"", 5th International Conference on Information Assurance and Security (IAS '09), pp. 513-516, Aug. 2009.

Yi, et al., ""Analysis and Design Strategy of UHF Micro-Power CMOS Rectifiers for Micro-Sensor and RFID Applications"", IEEE Transactions on Circuits and Systems I: Regular Papers, 54(1)1 53-166, Jan. 2007.

Ying, et al., "A System Design for UHF RFID Reader". In Communication Technology, 2008. ICCT 2008. 11th IEEE International Conference on, pp. 301-304. IEEE, Nov. 2008.

Zalesky, et al., ""Integrating segmented electronic paper displays into consumer electronic devices"", 2011 IEEE International Conference on Consumer Electronics (ICCE), pp. 531-532, Jan. 2011.

Zhang, et al., ""Frame retransmissions considered harmful: improving spectrum efficiency using micro-ACKs"", Proceedings of the 18th Annual International Conference on Mobile Computing and Networking (MobiCom '12), pp. 89-100, Aug. 2012.

Zhang, et al., "EkhoNet: High Speed Ultra Low-power Backscatter for Next Generation Sensors", School of Computer Science, University of Massachusetts, Amherst, MA 01003, Sep. 2014.

\* cited by examiner

AMBIENT BACKSCATTER TRANSCEIVERS, APPARATUSES, SYSTEMS, AND METHODS FOR COMMUNICATING USING BACKSCATTER OF AMBIENT RF SIGNALS

CROSS REFERENCE TO RELATED APPLICATION(S)

This application is a continuation of U.S. Non-Provisional application Ser. No. 15/601,836, filed May 22, 2017, now issued as U.S. Pat. No. 1,033,424 on Jul. 24, 2018, which is a continuation of U.S. Non-Provisional application Ser. No. 14/795,719, filed Jul. 9, 2015, and issued as U.S. Pat. No. 9,680,520 on Jun. 13, 2017. U.S. Non-Provisional application Ser. No. 14/795,719 is a continuation-in-part of International Application No. PCT/US2014/031462 filed Mar. 21, 2014, which claims the benefit under 35 U.S.C. § 119(e) of the earlier filing date of U.S. Provisional Application No. 61/804,520, filed Mar. 22, 2013. U.S. Non-Provisional application Ser. No. 14/795,719 claims the benefit under 35 U.S.C. § 119(e) of the earlier filing date of U.S. Provisional Application No. 62/023,125, filed Jul. 10, 2014. The aforementioned applications and patent are all incorporated herein by reference, in their entirety, for any purposes.

STATEMENT REGARDING FEDERALLY SPONSORED RESEARCH

This invention was made with government support under grant number EEC-1028725 awarded by the National Science Foundation and grant number CNS-1040663 awarded by the National Science Foundation. The government has certain rights in the invention.

TECHNICAL FIELD

Examples described herein are directed generally to wireless data transmission. In particular, examples are described that transmit data wirelessly by modulating a backscatter of an ambient RF signal.

BACKGROUND

Computing devices are increasingly embedded in objects and environments such as appliances, thermostats, books, furniture, and even implantable medical devices. A key issue is how to power these devices as they become smaller and numerous; wires are often not feasible, and batteries add weight, bulk, cost, and require recharging or replacement that adds costs and is difficult at large scales. Generating a conventional radio wave typically requires much more power than can be harvested from ambient RF signals. Traditional backscatter communication (e.g., RFID) provides a form of communicating by modulating reflections of an incident RF signal (e.g., rather than generating RF waves). Therefore, traditional backscatter transmission is orders of magnitude more energy-efficient than conventional radio communication. However, traditional backscatter communication requires deployment of a special purpose power infrastructure (e.g., an RFID reader) to transmit a high-power (1 W) signal to nearby devices, which the nearby devices use to backscatter. Additionally, traditional RFID systems, RFID tags must talk exclusively to an RFID reader and are unable to even sense the transmissions of other RFID tags.

SUMMARY

The summary is provided here by way of example and is not intended to limit the scope of any of the described examples or claims.

Examples of the present invention include systems, ambient backscatter transceivers, and methods. An example system an ambient backscatter transceiver that includes an antenna that may be configured to receive a backscattered ambient radio frequency (RF) signal, and a demodulator coupled to the antenna. The demodulator may be configured to demodulate the backscattered ambient RF signal to retrieve first data. The backscattered ambient RE signal may be generated by backscattering an ambient RF signal at a first frequency. The ambient RE signal may be configured to provide other data at a second frequency.

Examples of ambient backscatter transceivers may include an antenna configured to receive a backscattered ambient radio frequency (RF) signal. The backscattered ambient RF signal may be encoded with first data via backscatter modulation of an ambient RE signal at a first frequency. The ambient RE signal may be further modulated to provide second data at a second frequency. The example ambient backscatter transceiver may further include a receiver coupled to the antenna and configured to demodulate the backscattered ambient RE signal to generate output bits. The ambient backscatter transceiver may further include a microcontroller coupled to the receiver and configured to decode the output bits to retrieve data that is transmitted via the backscattered ambient RF signal.

An example method may include receiving a backscattered ambient radio frequency (RF) signal at an antenna. The backscattered ambient RF signal may be encoded with first data via backscatter modulation of an ambient RF signal at a first frequency and may be modulated to provide second data at a second frequency. The example method may further include demodulating the backscattered ambient RF signal to generate output bits. The example method may further include decoding the output bits at a microcontroller to retrieve the first data.

DETAILED DESCRIPTION

Certain specific details are set forth in the following description and in FIGS. 1-4 to provide a thorough understanding of various embodiments of the technology. Other details including well-known structures and systems often associated with sensors, transmitters, and receivers, have not been set forth in the following disclosure to avoid unnecessarily obscuring the description of the various embodiments of the technology. A person of ordinary skill in the art, therefore, will accordingly understand that the technology may have other embodiments with additional elements, or the technology may have other embodiments without several of the features shown and described below with reference to FIGS. 1-4.

Examples described herein include ambient backscatter transceivers that utilize radio frequency (RF) signals to communicate with each other and associated systems and methods. In several embodiments, for example, a system may include an ambient backscatter transceiver that is configured to transmit encoded data to a second ambient backscatter transceiver by modulating a backscatter of an ambient RF signal. The ambient backscatter transceivers may include low power circuitry for decoding the backscattered ambient RF signal, such as analog resistance-capacitance (RC) circuitry. In some embodiments, the ambient backscatter transceivers may include power harvest circuitry that harvests power from the ambient RF signal and provides the harvested power to power other circuitry of the ambient backscatter transceiver and/or other devices in communication with the harvested power. Ambient RF signals generally include any RF signals which may be received and back-scattered by transceivers described herein. The RF signals may be present in the environment front other signal sources, e.g. the ambient RF signals may be generated by telephones, computers, appliances, transceivers, and/or other devices and may be received and backscattered by ambient backscatter transceivers described herein.

Ambient RF signals may generally include any ambient RF signal, such as a television transmission signal, a radio transmission signal, a cellular communication signal (e.g., form a base station or a mobile device), a WiFi signal, or any other RF signal. In some embodiments, the ambient RF signal may be a continuously provided RF signal, such as the television signal.

Figure 1:
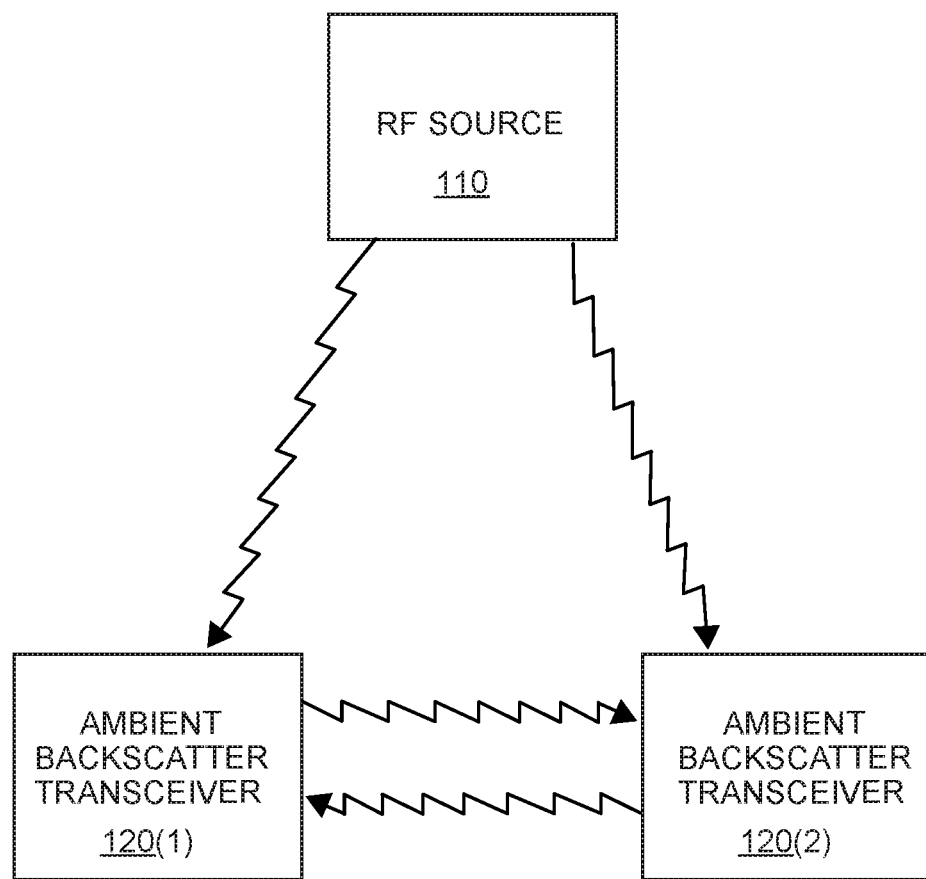
FIG. 1 is a block diagram of an ambient RF communication system including ambient RF transceivers according to an embodiment of the disclosure.

FIG. 1 is an illustrative example of an ambient backscatter communication system 100 according to an embodiment of the disclosure. The ambient backscatter system 100 may include a RF source 110 configured to provide a RF signal. The RF signal may include encoded data, such as television broadcast data, cellular communication data, WiFi network communication data, or any other data. The ambient backscatter system 100 may further include ambient backscatter transceivers 120(1-2) that are configured to communicate with each other by backscattering the RF signal (e.g., the ambient RF signal) from the RF source 110.

In an example operation where the ambient backscatter transceiver 120(1) transmits data to the ambient backscatter transceiver 120(2), the ambient backscatter transceiver 120(1) may modulate a backscatter of the ambient RF signal from the RF source 110 to provide a backscattered ambient RF signal encoded with the data to the ambient backscatter transceiver 120(2). The data transmitted by the ambient backscatter transceiver 120(1) may be related to data received from a sensor or an input, or may be related to data received from the ambient backscatter transceiver 120(2). The data transmitted by the ambient backscatter transceiver 120(1) may typically be different than the data which may be encoded in the ambient RF signal by the RF source 110.

Backscatter communication generally includes modulating reflection of an RF signal at an antenna, rather than generating an RF signal. The ambient RF signal used by the ambient backscatter transceiver 120(1) may include an ambient RF signal that is provided by the RF source 110 for another purpose, such as a television broadcast or cellular communication between a base station and a mobile device. In some examples, the backscattered ambient RF signal may be encoded with data using a modulation scheme. To generate the backscattered ambient RF signal, the ambient backscatter transceiver 120(1) may modulate the impedance of an antenna to alternate between two discrete states, e.g., reflecting and not-reflecting. The reflecting state of the antenna may provide a reflection of the ambient RF signal, and the non-reflecting state may not reflect the ambient RF signal. Thus, the ambient backscatter transceiver 120(1) may indicate either a '0' or a '1' bit by switching the state of the antenna between the reflecting and nonreflecting states. The ambient RF signal that is reflected by the ambient backscatter transceiver 120(1) may create an additional path (e.g., a backscattered ambient RF signal) from ambient backscatter transceiver 120(1) to the ambient backscatter transceiver 120(2). The ambient backscatter transceiver 120(2) may decode data encoded in the backscattered ambient RF signal by sensing the reflected power level changes in the backscattered ambient RF signal by the ambient backscatter transceiver 120(1). Receivers associated with the RF source 110 (e.g., receivers for TV and cellular applications) may be designed to compensate for multi-path wireless channels to avoid interference of receiving the same signal via multiple paths, and thus may be able to account for (e.g., filter out) the backscattered ambient RF signal from the ambient backscatter transceiver 120(1).

In order to decode the backscattered ambient RF signal to retrieve the data, the modulation frequency of the ambient RF signal may be greater than the modulated backscatter frequency of the backscattered ambient RF signal Switching the state of the antenna of the ambient backscatter transceiver 120(1) may include adjusting an impedance of the antenna. Generally, when a wave encounters a boundary between two media that have different impedances/densities, the wave gets reflected back. The amount of reflection is typically determined by the difference in the impedance values of the antenna. By modulating the electrical impedance at the antenna, the amount of incident RF energy that is scattered is modulated, thus enabling information to be transmitted. For example, in the reflecting state, the antenna may have low impedance (e.g., a short circuit) to a reference node and may reflect the ambient RF signal to provide a backscattered ambient RF signal that has a first signal amplitude. In the non-reflecting state, the antenna may have high impedance (e.g., an open circuit) to the reference node, and may reflect the ambient RF signal to provide a backscattered ambient RF signal that has a second signal amplitude. The first amplitude may be greater than the second amplitude. In some embodiments, the second amplitude has a nominal or near zero amplitude. The antenna may be designed for a frequency of a targeted ambient RF signal. The ambient backscatter transceiver 120(1) may modulate a backscatter of the ambient RF signal to provide the backscattered ambient RF signal at a lower frequency than the modulation frequency of the ambient RF signal. Because the ambient RF signal may already be included encoded data, by modulating a backscatter of the ambient RF signal at a lower frequency may improve reliability in decoding the backscattered ambient RF signal at the ambient backscatter transceiver 120(2).

The ambient backscatter transceiver 120(2) may receive the backscattered ambient RF signal from the ambient backscatter transceiver 120(1). Because the backscattered ambient RF signal is modulated by the ambient backscatter transceiver 120(2) at a lower rate than the ambient RF signal, the ambient backscatter transceiver 120(2) may separate the ambient RF signal from the backscattered ambient RF signal by leveraging the difference in communication rates. For example, the ambient backscatter transceiver 120(2) may extract the data of the backscattered ambient RF signal using averaging mechanisms. Amplitude of the ambient RF signal changes at a fast rate, and hence adjacent samples in the ambient RF signal tend to be more uncorrelated than adjacent samples in the backscattered ambient RF signal. Thus, averaging the received backscattered ambient RF signal across multiple samples of the ambient RF signal, may effectively remove the variations in the ambient RF signal, allowing the data encoded in the backscattered ambient RF signals to be decoded.

While FIG. 1 depicts two ambient backscatter transceivers 120(1-2), the ambient backscatter communication system 100 may include more than two ambient backscatter transceivers, and ambient backscatter communication may occur between two or more of the ambient backscatter transceivers. In some embodiments, the ambient backscatter transceivers may, prior to transmitting, use carrier sense to detect a transmission from another ambient backscatter transceiver in order to avoid interfering transmissions between the ambient backscatter transceivers.

Figure 2:
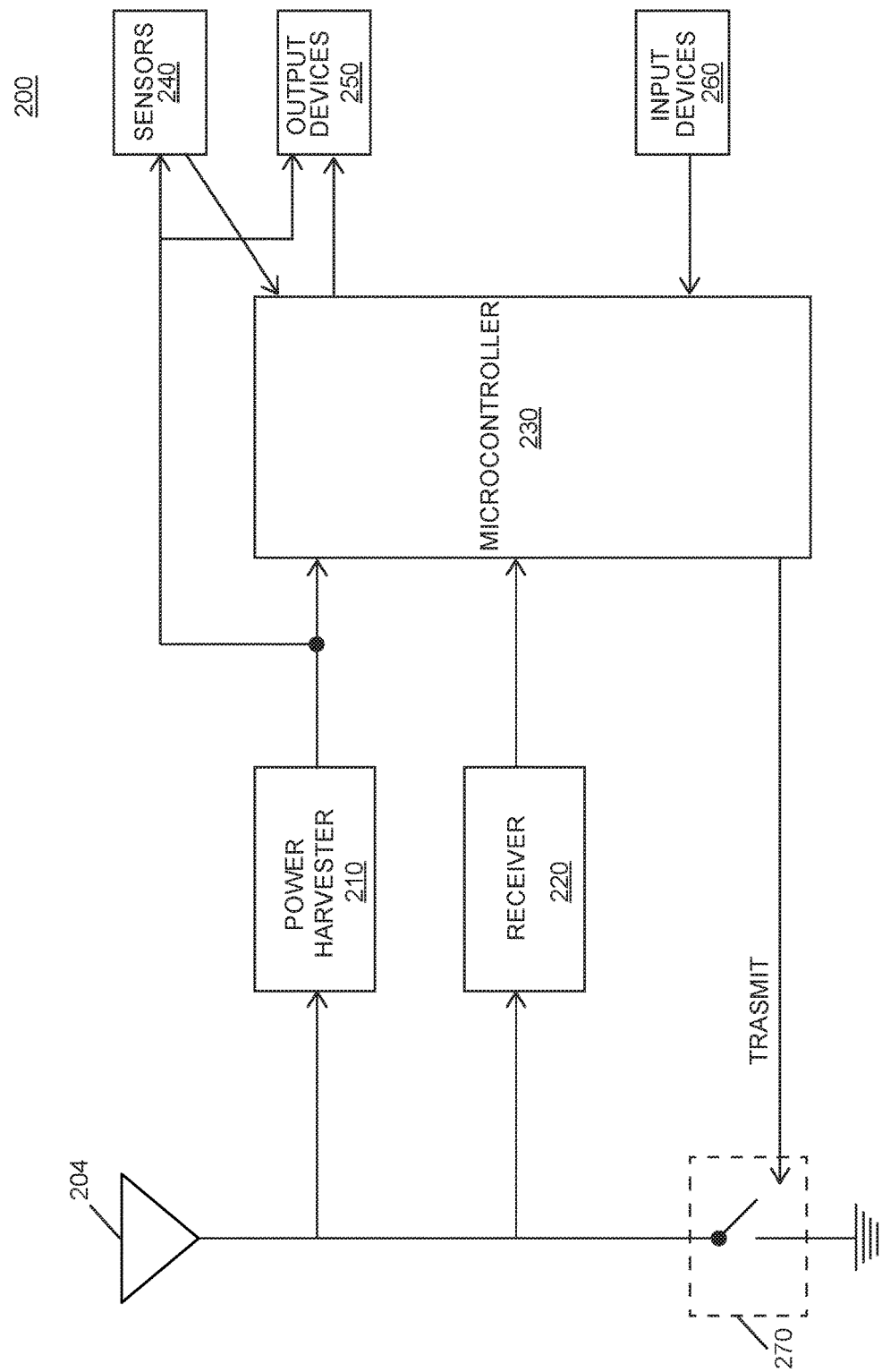
FIG. 2 is a block diagram of an ambient RF transceiver according to an embodiment of the disclosure.

FIG. 2 is a block diagram of an ambient backscatter transceiver 200 in accordance with embodiments of the present disclosure. The ambient backscatter transceiver 200 may include, for example, an antenna 204 coupled to a power harvester 210, a receiver 220, and a transmitter 270. The power harvester 210 may be configured to generate power from an ambient RF signal received via the antenna 204, and provide the power to a microcontroller 230, sensors 240, and output devices 250. The amount of power that the power harvester 210 is able to harvest from the ambient RF signal may be based on the range and broadcast power of the ambient RF signal. In some examples, the power harvester 210 may harvest at least 60 µW of power from the ambient RF signal. In other embodiments, the power harvester 210 may harvest up to 3 mW from the ambient RF signal. The receiver 220 may demodulate a backscattered ambient RF signal received via the antenna 204, and provide the demodulated signal to the microcontroller 230. The microcontroller 230 may process the demodulated signal from the receiver 220 to retrieve the data. In some embodiments, the microcontroller may store the data, control the output devices 250 based on the retrieved data, and/or may respond to a transmitting ambient backscatter transceiver. The microcontroller 230 may also receive input data from the sensors 240 and/or input devices 260. Based on the input data, the microcontroller 230 may control the transmitter 270 to modulate a backscatter of the ambient RF signal via the antenna 204 to transmit the data. The ambient backscatter transceiver 200 may be used to implement the ambient backscatter transceivers 120(1-2) of FIG. 1.

The power harvester 210, receiver 220, and transmitter 270 are all connected to a single antenna 204 in FIG. 2. The receiver 220 and transmitter 270 may use modulated backscattering of an ambient RF signal to communicate with one or more other ambient backscatter transceiver 200. The power harvester 210 may harvest energy from the ambient RF signal, and may provide the harvested energy to the power the microcontroller 230 (e.g., micro-controller), sensors 240, and output devices 250. The power harvester 210, receiver 220, and transmitter 270 may operate independent of each other. While the transmitter 270 is actively modulating a backscattered ambient RF signal, the power harvester 210 and receiver 220 may capture limited power/signals.

In operation, the ambient backscatter transceiver 200 may transmit data by modulating a backscatter transmission of an ambient RF signal. The ambient backscatter transceiver 200 may also receive data by decoding modulation of a backscattered ambient RF signal. As previously described, backscattering transmission is achieved by changing the impedance of the antenna 204 via the transmitter 270 in the presence of an ambient RF signal. The microcontroller 230 may control the transmitter 270 to modulate the impedance of the antenna 204 and cause a change in the amount of energy of the ambient RF signal reflected by the antenna 204. For example, the microcontroller 230 may receive data from the sensors 240 or the input devices 260 (e.g., respond to a communication received from another ambient backscatter transceiver), and may modulate the transmitter 270 to encode the received data by modulating a backscatter of the ambient RF signal to produce the backscattered ambient RF signal that may be received by another ambient backscatter transceiver. Further, the receiver 220 may demodulate a received backscattered ambient RF signal from another ambient backscatter transceiver to provide output bits, and provide the output bits to the microcontroller 230. The microcontroller 230 may decode the output bits to retrieve data. In some embodiments, the microcontroller 230 may control the output devices 250 based on the decoded data. In some embodiments, the power harvester 210 may be the sole power source for the ambient backscatter transceiver 200. The power harvester 210 may harvest power from the ambient RF signal and provide the harvested power to power the microcontroller 230, sensors 240, and output devices 250.

In some embodiments, the antenna 204 includes a dipole antenna. The transmitter 270 may include a switching device (e.g., a transistor) connected across the two branches of the antenna 204. The input signal to the transmitter 270 from the microcontroller 230 may be modulated between a logical high value and a logical low value to encode a sequence of data bits. For example, when the input to the transmitter 270 is a logical low value, the transmitter 270 may be off and has no effect on the antenna 204 (e.g., presenting some nominal small amount of backscattering or non-reflected signal). When the input signal to the transmitter 270 is a logical high value, the transmitter 270 may be in a conducting state that shorts the two branches of the antenna 204, which results in a larger backscattered (e.g., reflected) signal amplitude. Thus, modulating of the transmitter 270 toggles the antenna 204 between the backscatter (reflective) and non-backscatter (non-reflective) states to convey bits to a receiver. In order to facilitate demodulating and decoding of the data encoded using the backscattered ambient RF signal at a receiving device (e.g., a receiver of another ambient backscatter transceiver), the modulation frequency of the transmitter 270 may be less than a modulation frequency of the ambient RF signal. This is because the ambient RF signal may already be encoded with data for another purpose (e.g., video data for a television channel), and encoding data at the same frequency may make it difficult or impossible to decipher the backscattered ambient RF signal data from the ambient RF signal data.

In an exemplary embodiment, implementation of the antenna 204 includes a 258 millimeter dipole antenna that is tuned for a subset of the ultra-high frequency (UHF) television (TV) band. The antenna may be a single antenna and/or omnidirectional with respect to a direction in which signals may be sent and received. Moreover, the receiver 220 may operate on only the input signal from a single antenna without the need for a second antenna or even an estimated second antenna signal. In other embodiments, implementation of the antenna 204 may include an antenna tuned for cellular, WiFi, or other frequencies. Other antenna topologies such as meandered antennas and folded dipoles may also be used. Further, RF switches may have a large difference between conducting and non-conducting impedance values for a specific frequency range, and little difference in other frequency ranges. Thus, a switching device of the transmitter 270 may be selected that has a large conducting and non-conducting impedance difference in the desired frequency range.

Note that the transmitter 270 and the antenna 204 may be capable of backscattering ambient RF signals across a tuned frequency band. In the example where the antenna 204 includes a 258 millimeter dipole antenna that is tuned for a subset of the ultra-high frequency (UHF) television (TV) band, the subset of the UHF frequency band may include a subset of frequencies that includes multiple channels. For example, in advanced television systems committee (ATSC) standards, each TV channel has a 6 MHz bandwidth with different TV channels allocated to adjacent non-overlapping frequencies. The transmitter 270 and the antenna 204 may be capable of backscattering a signal of any one of multiple channels as long as the channel frequency falls within the tuned frequency band of the transmitter 270 and the antenna 204.

The receiver 220 may receive and demodulate the backscattered ambient RF signal to provide output bits. As explained above, because the ambient RF signal is already encoded with information (e.g., video data for a television channel), reliably decoding additional data from the backscattered ambient RF signal may be difficult. Additionally, in some embodiments it is desired to decode the backscattered ambient RF signal using circuitry that requires little or no external power (e.g., without using power-hungry hardware components such as ADCs and oscillators). An example is described herein illustrating how a backscattered ambient RF signal can be demodulated and decoded using a conventional digital receiver. As explained above, ambient RF signals (e.g., TV and cellular transmissions) may be encoded with information (e.g. TV and/or cellular data) that is not controllable. Because the ambient RF signal is modulated based on encoded data, the instantaneous power level is constantly fluctuating based on the encoded data. Thus, the receiver 220 may be capable of decoding the backscattered ambient RF signal in the presence of the ambient RF signal with fast changing power levels.

The following example is based on an assumption of a digital receiver that samples the analog signal and performs demodulation and decoding in the digital domain. As explained above, the transmitter 270 may modulate a backscatter of the ambient RF signal at a lower frequency than the modulation frequency of the ambient RF signals. Based on the two different frequencies, the receiver 220 may separate the two signals (e.g., the backscattered ambient RF signal from the ambient RF signal) by leveraging the difference in communication frequencies. Using the television ambient RF signal as an example, since the ambient RF signals encode information at a bandwidth of 6 MHz, the transmitter 270 may backscatter information at a lower frequency (e.g., longer time period) than the frequency at which ambient TV signals change. At the receiver 220, data encoded in the backscattered ambient RF signal is extracted using averaging mechanisms. Because the wideband ambient TV signals change at a faster rate than rate of change of the backscattered ambient RF signal (e.g., adjacent samples in TV signals tend to be more uncorrelated than the adjacent samples of the backscattered ambient RF signal). Therefore, by averaging a received signal across multiple samples, the variations in the ambient TV signals are masked, which allows the receiver 220 to decode the backscattered ambient RF signal. In the context of a digital receiver that samples the received signal at the Nyquist-information rate of the ambient TV signal, the received samples, y[n], can then be expressed as a combination of the ambient TV signals and the backscattered ambient RF signal, e.g.:

$$y[n]=x[n]+\alpha B[n]x[n]+w[n]$$

where x[n]s are the samples corresponding to the ambient TV signal as received by the receiver, w[n] is the noise, α is the complex attenuation of the backscattered ambient RF signal relative to the TV signals, and B[n] are the bits transmitted by the transmitter 270. Since the receiver samples at the ambient TV Nyquist frequency, the $_N$ adjacent samples in x[n] are uncorrelated. Now, if the backscatterer conveys information at a 1/N fraction of the rate, then B[Ni+j]s are all equal for j=1 to N. If the receiver 220 averages the instantaneous power in the N receiver samples corresponding to a single backscattered hit, then we get:

$$\frac{1}{N}\sum_{i=1}^{N}|y[n]|^2 = \frac{1}{N}\sum_{i=1}^{N}|x[n]+\alpha Bx[n]+w[n]^2|$$

where B is either '0' or '1'. Since the ambient TV signal, x[n], is uncorrelated with noise w[n], the equation can be rewritten as:

$$\frac{1}{N}\sum_{i=1}^{N}|y[n]|^2 = \frac{|1+\alpha B|}{N}\sum_{i=1}^{N}|x[n]^2|+\frac{1}{n}\sum_{i=1}^{N}|w[n]^2|$$

Assuming P is the average power in the received ambient TV signal, e.g., $$P = \frac{1}{N}\sum_{i=1}^{N}|x[n]^2|$$

The noise aside, the average power at the receiver 220 may be $|1+\alpha|^2*P$ when the backscattered ambient RF signal being reflected and P when the backscattered ambient RF signal is not being reflected. The receiver 220 may be able to distinguish between the two power levels, $|1+\alpha|^2*P$ and P, to decode the information from the backscattered ambient RF signal. Thus, even in the presence of changes in the ambient TV signal, the receiver 220 may be able to decode information from the backscattered ambient RF signal.

In an example operation, a transmitter (e.g., the transmitter 270 and the microcontroller 230 of another ambient backscatter transceiver 200) may be set to transmit an alternating sequence of ones and zeros (e.g., reflecting and not reflecting) at a rate of 1 kilobits per second (Kbps). By averaging the received power levels over X number of samples, the effect of the fast-varying ambient TV signal may be reduced. This may allow the receiver to decipher two average power levels in the backscattered ambient RF signal that can be used to decode the backscattered information.

Modulating a backscatter of the ambient RF signal may cause either an increase or a decrease in the average power of the received backscattered ambient RF signal. Specifically, the channel, α, is a complex number and hence $|1+\alpha|$ can be either less than or greater than one. Thus, a '0' bit may be either a lower power than the average power P, or a higher power than the average power P. This is because the additional multi-path (e.g., the backscattered ambient RF signal) created by the backscattering transmitter (e.g., the transmitter 270 of another ambient backscatter transceiver 200) can either constructively or destructively interfere with the existing ambient RF signal. To mitigate this problem, differential coding may be used to eliminate requiring knowledge of mapping between the power levels and the bits.

Figure 3:
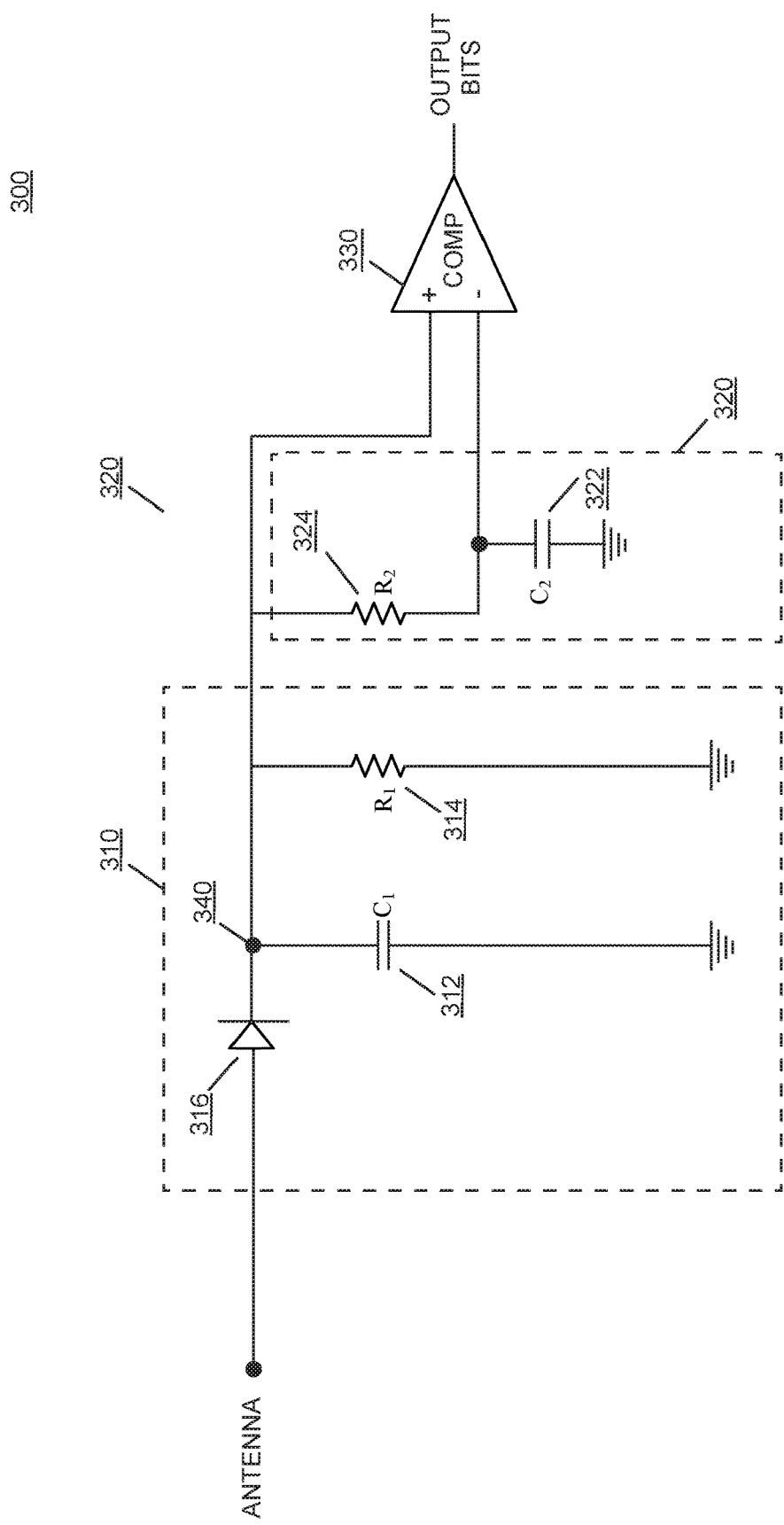
FIG. 3 is a block diagram of a receiver of an ambient RF transceiver according to an embodiment of the disclosure.

The above description generally assumes that the receiver 220 may receive digital samples on which it can perform operations such as averaging and comparison of power levels. However, acquiring digital samples of the ambient RF signals may require an analog-to-digital converter (ADC), which consumes a large amount of power, and is typically avoided in ultra-low power designs. Thus, the receiver 220 may be implemented using analog circuitry that mimics or emulates the digital receiver operation, as depicted in FIG. 3. Specifically, embodiments of the receiver 220 may be implemented in analog circuitry only, including those in which the receiver consists of components such as those depicted in FIG. 3. In some embodiments, the receiver 220 may consume less than 1 μW of power, or less than 0.6 μW of power.

The receiver 300 of FIG. 3 may be used to implement the receiver 220 of FIG. 2. As shown in FIG. 3, the receiver 300 may include an averaging circuit 310 and a threshold circuit 320. The receiver 300 may include two main circuits: e.g., an averaging circuit 310 that smoothes out the natural variations in the ambient RF signal and a threshold circuit 320 that computes the threshold between the two levels and compares the incoming signal level with the threshold, to output bits. Outputs of the averaging circuit 310 and the threshold circuit 320 may be provided to inputs of the comparator 330, which provides output bits based on the inputs.

The averaging circuit 310 may be implemented using an envelope detector to smooth/average out the natural variations in the ambient RF signal. As shown in FIG. 3, the averaging circuit 310 may include a diode 316 connected to a capacitor C1 312, in parallel with a resistor R1 314. The diode 316 allows current to flow in one direction to the node 340. When the input voltage of the diode 316 is greater than the voltage of the node 340, the diode 316 provides the input voltage to the node 340 to charge the capacitor C1 312. When the input voltage of the diode 316 is lower than the voltage of the node 340, the diode 316 does not provide the input voltage to the node 340, and the resistor R1 314 slowly dissipates the charge stored on the diode 316, lowering the voltage at the node 340. The rate of drop of voltage is determined by the product R1*C1. Thus, by picking approximate values of the resistor R1 314 and the capacitor 312, the above circuit may average the fast variations in the ambient RF signal, but preserve the slow variations of backscattered ambient RF signal. The node 340 may be coupled to a first input of the comparator 330.

The threshold circuit 320 may include a resistor R2 324 and a capacitor C2 322. The resistor R2 324 may be coupled between the node 340 and a second input of the comparator 330 and the capacitor C2 322 may be coupled between the second input of the comparator 330 and a reference node (e.g., a ground node). The comparator 330 may provide output bits based on the first input and the second input.

In operation, the threshold circuit 320 establishes a threshold value that is a rolling average over a time period greater than a time period of a backscatter modulation frequency. In principle, a digital receiver with an ADC can distinguish between the two signal levels by processing of the digital samples. In an example where two signals have different voltages, $V_0$ and $V_1$, wherein $V_1 > V_0$ and where $V_0$ and $V_1$ correspond to the power levels for the '0' and '1' bits. To distinguish between the $V_0$ and $V_1$, the receiver 300 would first compute a threshold value, which may be the average of the two signal voltage levels. When the received signal is greater than the threshold, the digital receiver may conclude that the received signal is $V_1$. Otherwise, the digital receiver may conclude that the received signal is $V_0$.

However, since the receiver 300 may include a low-power receiver design, the averaging circuit 310 and the threshold circuit 320 may emulate the operation of an ADC using analog circuitry. The receiver 300 may include RC circuitry in the averaging circuit 310 and the threshold circuit 320. The averaging circuit 310 may include the resistor R1 314 and the capacitor C1 312 to perform averaging over a time period longer than a time period associated with the modulation of the ambient RF signal, but less than a time period associated with the backscatter modulation frequency, to provide the average value. The threshold circuit 320 may include the resistor R2 324 and the capacitor C2 322 to perform averaging over a time period longer than a time period associated with the backscatter modulation frequency to provide the threshold value. The comparator 330 compare the threshold value from the threshold circuit 320 and the average signal from the averaging circuit 310, and output either a '0' or a '0' to indicate which of the two values is larger. Thus, the comparator 330 may effectively perform the function of a one bit ADC, but consuming less power than an ADC.

The frequency of the backscattered ambient RF signal may be used to determine the RC values for the averaging circuit 310 and the threshold circuit 320. Specifically, a receiver 300 receiving bits at 10 Kbps requires a different RC circuit than one at 1 Kbps. This may be because the frequency of the backscattered ambient RF signal determines how much time each bit occupies on a channel. Generally, the lower the backscattered ambient RF signal frequency, the more averaging required to determine the threshold value. In some embodiments, the values of the capacitor C1 312, resistor R1 314, capacitor C2 322, and resistor R2 324 are configurable (e.g. using a programmable capacitor and/or resistor) based on the desired frequency of the backscattered ambient RF signal.

The maximum practical distance between two transceivers able to receive each other's backscattered communications may be determined in some examples based on a voltage difference detection capability of the comparator 330. As two ambient backscatter transceivers (e.g., the ambient backscatter transceivers 120(1-2) of FIG. 1), move farther apart, the backscattered ambient RF signal becomes more attenuated at the receiver 300. The comparator 330 may only be capable of detecting voltage differences between the first input and the second input that exceed a minimum gap threshold. The minimum gap threshold of the comparator 330 may be used to determine the maximum distance at which two ambient backscatter transceivers can reliably communicate with each other. In some embodiments, the minimum gap threshold is 2.4 mV.

The network stack design for ambient backscatter communication may be integrated with the properties of the circuits and the previously described with reference to FIGS. 1-3. In the following example, described ambient backscatter transceivers may be implemented using the ambient backscatter transceivers 120(1-2) of FIG. 1, and described transmitters may be implemented using the ambient backscatter transceivers 120(1-2) of FIG. 1 and/or the microcontroller 230 and/or transmitter 270 of FIG. 2. Additionally, described microcontrollers may be implemented using the ambient backscatter transceivers 120(1-2) of FIG. 1 and/or the microcontroller 230 of FIG. 2, and described receivers may be implemented using the ambient backscatter transceivers 120(1-2) of FIG. 1, the receiver 220 of FIG. 2, and/or the receiver 300 of FIG. 3. The physical layer for ambient backscatter communication generally determines modulation and coding schemes used to encode and transmit data via the backscattered ambient RF signal, which may be used to detect packets and bit boundaries.

As previously described, example transmitters described herein may work by switching the antenna between reflecting and non-reflecting states. Doing so effectively creates an ON-OFF keying modulation. However, the backscattered ambient RF signal could either constructively or destructively interfere with the ambient TV signal. For example, depending on a location of the receiver, a '1' bit could appear as either an increase or a decrease in the received power. In order to overcome this limitation, the ambient backscatter transceiver may use biphase space encoding (FM0). FM0 encoding may turn every bit into two symbols and may encode information using symbol transitions. For example, FM0 has a symbol transition at the beginning of every bit period, along with an additional mid-bit transition to represent a '1', and no such transition in the '0' bit. Thus, the bits are encoded in the backscattered ambient RF signal using transitions in the power level, rather than the actual power levels.

At the beginning of each packet transmission, ambient backscatter transceivers, such as the ambient backscatter transceivers 120(1-2), transmit a known preamble. The receiver may detect the preamble using bit-level correlation (e.g., at a microcontroller). Because an ambient backscatter transceiver may not know when another nearby ambient backscatter transceiver is transmitting, a microcontroller of the ambient backscatter transceiver may only begin detecting a packet when the comparator (e.g., the comparator 330 of FIG. 3) detects bit transitions. The comparator may operate using very little power, and has the built-in minimum gap threshold before it is capable of detecting bit transitions. It is only when the power difference crosses the minimum gap threshold in some examples that an interrupt may be sent to the microcontroller to wake the microcontroller up from an idle state in order to perform the bit-level correlation of the preamble. Because the averaging circuit 310 of FIG. 3 masks the large variations in the ambient RF signal, it is unlikely that an ambient RF signal alone may maintain a power level long enough to create a detectable change power level at the comparator 330.

Figure 4:
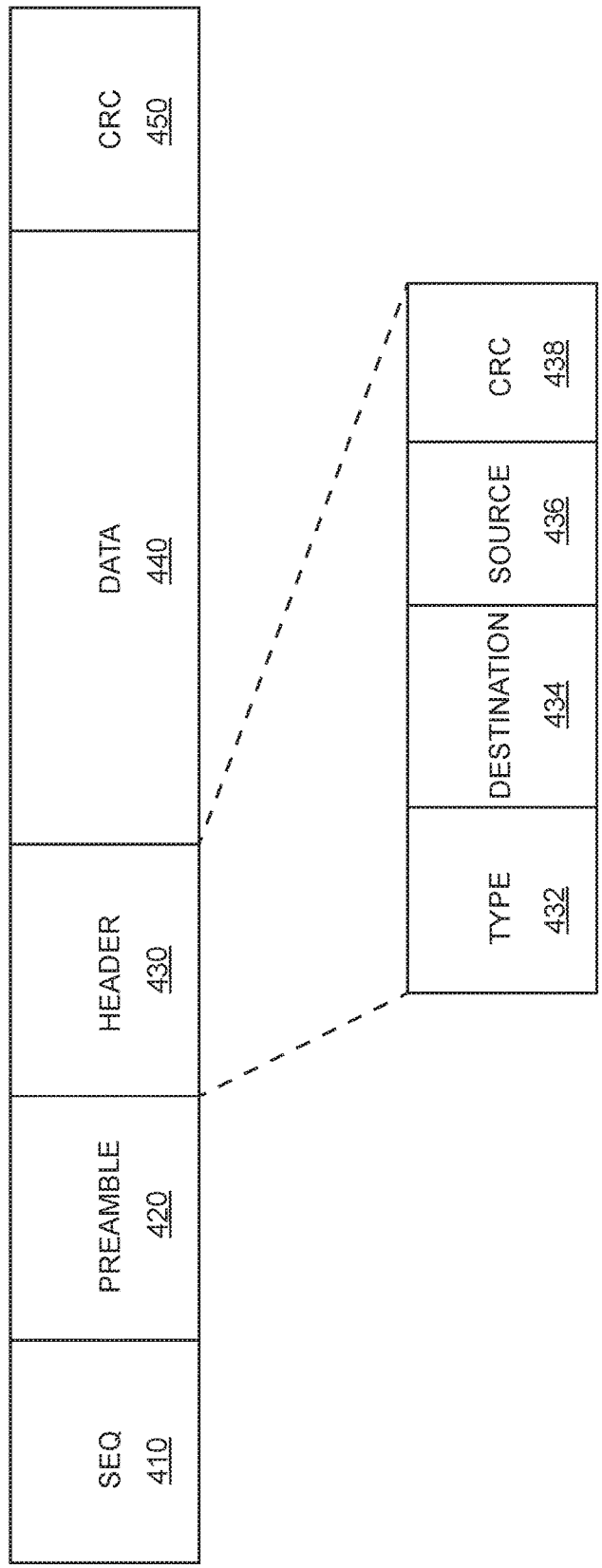
FIG. 4 is a block diagram of a packet structure for using in the ambient RF communication system according an embodiment of the disclosure.

Data may be transmitted back and forth between ambient backscatter transceivers using any data packet stricture. FIG. 4 depicts an exemplary structure of a packet 400 used for ambient backscatter communication between ambient backscatter transceivers. The packet 400 may include an initial bit sequence 410 followed by a preamble 420. The preamble 420 may be followed by a header 430 and data 440. The packet 400 may include a cyclic redundancy code (CRC) 450 at the end for error checking.

Starting with the bit sequence 410 and the preamble 420, the transmitter may transmit the bit sequence 410 followed by the preamble 420 in order to allow the ambient backscatter transceiver sufficient time to wake the microcontroller for detection of the packet. In some embodiments, the bit sequence 410 may be an alternating '0-1' bit sequence. The alternating bit sequence may be long enough (e.g., 8 bits) to wake up the microcontroller 230 to begin detection of bit boundaries and framing.

The preamble 420 may be used by the receiver to detect the beginning of a packet. The preamble 420 may be followed by the header 430 containing information about the packet. The header 430 may include a type 432 that indicates a type of packet (e.g., data/ACK), a destination 434 and source 436 to indicate destination and source addresses (e.g., of the ambient backscatter transceivers). In some embodiments, the header 430 may include a length field after the source 436. The header 430 may further include a CRC 438 that is used by the microcontroller (e.g., the microcontroller 230 of FIG. 2) to detect bit errors in the received header 430. After the header 430, the packet 400 further includes the data 440. The packet 400 also includes a CRC 450 that can be used by the receiver to detect bit errors from the received data 440. In some examples, the data 440 may also be protected using simple error correction codes that do not require consumption of significant power (e.g., hamming codes, repetition codes, etc.) The receiver may successfully receive a packet when both CRC checks based on the CRC 438 and the CRC 450 pass. The receiving ambient backscatter transceiver may transmit an acknowledgment packet to the transmitting ambient backscatter transceiver within a pre-set time responsive to successively receiving a data packet. The preset time may be determined based on the time it takes to successfully decode a data packet at the receiving ambient backscatter transceiver, and switch to a transmitting state.

The ambient backscatter transceivers may have an ability to communicate with each other wirelessly, rather than being a one-way communication. Thus, each ambient backscatter transceiver may be capable of performing carrier sense to detect packet transmissions (preamble correlation), and detect energy in the middle of a packet transmission (energy detection) from another ambient backscatter transceiver.

In an example, the ambient backscatter transceivers may use carrier sense to arbitrate a wireless medium between transmitters of the ambient backscatter transceivers using an averaging property of the comparator (e.g., the comparator 330 of FIG. 3). For example, in the absence of a transmitting ambient backscatter transceiver, the receiver, using the output of the comparator, may detect that the ambient RF signal is constant. This may be because, as previously described, the comparator has a minimum threshold below which it does not register any changes. Since the averaging circuit and the threshold circuit (e.g., the averaging circuit 310 and threshold circuit 320 of FIG. 3) averages rapid variations in the ambient RF signal over a period of time, the rapid signal changes in the ambient RF signal may be masked, and the small variations that result from the averaging may remain below a threshold of the comparator. Thus, in the absence of a nearby backscattering ambient backscatter transceiver, the comparator typically outputs either a constant sequence of ones or a constant sequence of zeros. A nearby transmission from another ambient backscatter transceiver, on the other hand, may result in changes that are greater than the threshold of the comparator, and hence results in changing bits at the output of the comparator. In embodiments where FM0 encoding is used, the transmitted bits have an equal number of ones and zeros, the comparator outputs an equal number of ones and zeros. Thus, by comparing the number of ones and zeros allows the receiver to distinguish between the presence and absence of a backscatter transmission. In some examples, the receiver may perform energy detection using the following equation:

$$D = 1 - \frac{|\#\text{ones} - \#\text{zeros}|}{\#\text{ones} + \#\text{zeros}} \sum_{i=1}^{N} |x[n]^2|$$

where #ones and #zeros denote the number of ones and zeroes, respectively, detected at the receiver. In the presence of a transmitting ambient backscatter transceiver that encodes data using the FM0 encoding scheme, an average number of ones and zeros detected by the receiver of a receiving ambient backscatter transceiver may be approximately equal, which makes D approximately one. Conversely, in the absence of a transmitting ambient backscatter transceiver, the bits detected by the receiver of a receiving ambient backscatter transceiver may be either mostly ones or mostly zeros, which makes D approximately zero. In some embodiments, a transmitting ambient backscatter transceiver may only perform carrier sense before it begins transmitting. This may reduce power consumption by the ambient backscatter transmitter.

Other modulation and carrier sense schemes may be used to encode the data for ambient backscatter transmission via the ambient backscatter transceivers. The data of a transmitted data packet may be generated from or based sensor data, input data, or data received from another ambient backscatter transceiver.

Examples of systems, methods, and devices providing full-duplex backscatter are further described in U.S. provisional application 62/023,125 filed Jul. 10, 2014 entitled "Full duplex backscatter communication," which application is hereby incorporated by reference in its entirety for any purpose.

From the foregoing it will be appreciated that although specific embodiments of the technology have been described herein for purposes of illustration, various modifications may be made without deviating from the spirit and scope of the technology. Also, in some embodiments the microcontroller can be omitted, or the battery can be larger. Further, certain aspects of the new technology described in the context of particular embodiments may be combined or eliminated in other embodiments. Moreover, while advantages associated with certain embodiments of the technology have been described in the context of those embodiments, other embodiments may also exhibit such advantages, and not all embodiments need necessarily exhibit such advantages to fall within the scope of the technology. Accordingly, the disclosure and associated technology can encompass other embodiments not expressly shown or described herein. Thus, the disclosure is not limited except as by the appended claims.

What is claimed is:

1. A system comprising:
   a backscatter transceiver comprising:
   an antenna configured to receive a radio frequency (RF) signal;
   a demodulator coupled to the antenna, the demodulator comprising a threshold circuit configured to compare variations in the RF signal representative of a first backscattered RF signal, wherein the demodulator is configured to demodulate the first backscattered RF signal in part using the threshold circuit to retrieve at least one first impedance state; and
   a transmitter configured to modulate an impedance of the antenna to provide a second backscattered ambient RF signal encoded with modulated symbols indicative of at least one second impedance state associated with the antenna.

2. The system of claim 1, wherein the at least one second impedance state of the antenna comprise discrete states of the antenna.

3. The system of claim 2, wherein the discrete states of the antenna comprises a reflecting state and a non-reflecting state.

4. The system of claim 1, wherein the RF signal is an ambient RF signal corresponding to at least one of a television broadcast signal, a cellular communication signal, or a WiFi signal.

5. An apparatus comprising:
   an antenna configured to receive a radio frequency (RF) signal;
   a receiver coupled to the antenna and configured to compute variations of the RF signal to generate output bits, the variations representative of a first backscattered RF signal;
   a microcontroller coupled to the receiver and configured to decode, at least in part using a threshold circuit, the output bits to retrieve first data associated with the first backscattered RF signal; and
   a transmitter configured to selectively modulate an impedance of the antenna at a modulation rate to provide a second backscattered RF signal encoded with second data.

6. The apparatus of claim 5, wherein the modulation rate corresponds to a rate that modulates a phase of the second backscattered RF signal.

7. The apparatus of claim 5, wherein the transmitter comprises a switch configured to selectively alternate among states of the antenna.

8. The apparatus of claim 7, wherein the states comprise a reflecting state and a non-reflecting state.

9. The apparatus of claim 8, wherein the reflecting state and the non-reflecting state are complex conjugates of each other.

10. The apparatus of claim 5, wherein the modulation rate corresponds to a rate that modulates an amplitude of the second backscattered RF signal.

11. The apparatus of claim 5, further comprising an output device that is controlled by the microcontroller based on the first data.

12. A method, comprising:
   receiving a backscattered radio frequency (RF) signal at an antenna, the backscattered RF signal encoded with first impedance data;
   demodulating the backscattered RF signal to generate output bits, wherein demodulating the backscattered ambient RF signal comprises using a threshold circuit configured to compare variations in the backscattered RF signal;
   decoding the output bits at a microcontroller to retrieve the first data; and
   modulating a phase or an amplitude of an ambient RF signal via the antenna to provide a second backscattered RF signal encoded with second data.

13. The method of claim 12, further comprising:
   receiving an ambient RF signal; and
   harvesting energy from the ambient RF signal to power the microcontroller.

14. The method of claim 12, wherein modulating the phase or the amplitude of the ambient RF signal via the antenna to provide the second backscattered RF signal encoded with the second data comprises modulating the impedance of the antenna at a modulation frequency.

15. The method of claim 14, wherein the modulation rate corresponds to a rate that modulates a phase of the second backscattered RF signal.

16. The method of claim 12, further comprising:
receiving sensor data from a sensor, wherein the second data is based on the sensor data.

17. The method of claim 12, wherein the second backscattered RF signal is encoded according to a biphase space encoding.

18. The method of claim 12, wherein modulating the phase or the amplitude of the ambient RF signal via the antenna to provide the second backscattered RF signal encoded with the second data comprises switching the antenna at a modulation frequency.

19. The method of claim 18, wherein switching the antenna at a modulation frequency comprises adjusting an impedance of the antenna.

20. The method of claim 12, further comprising:
before modulating the phase or the amplitude of the ambient RF detecting whether another backscattered RF signal is being transmitted.

* * * * *